June 14, 1927.
R. TAYLOR ET AL
1,632,635
FLYTRAP
Filed June 28, 1926
3 Sheets-Sheet 2
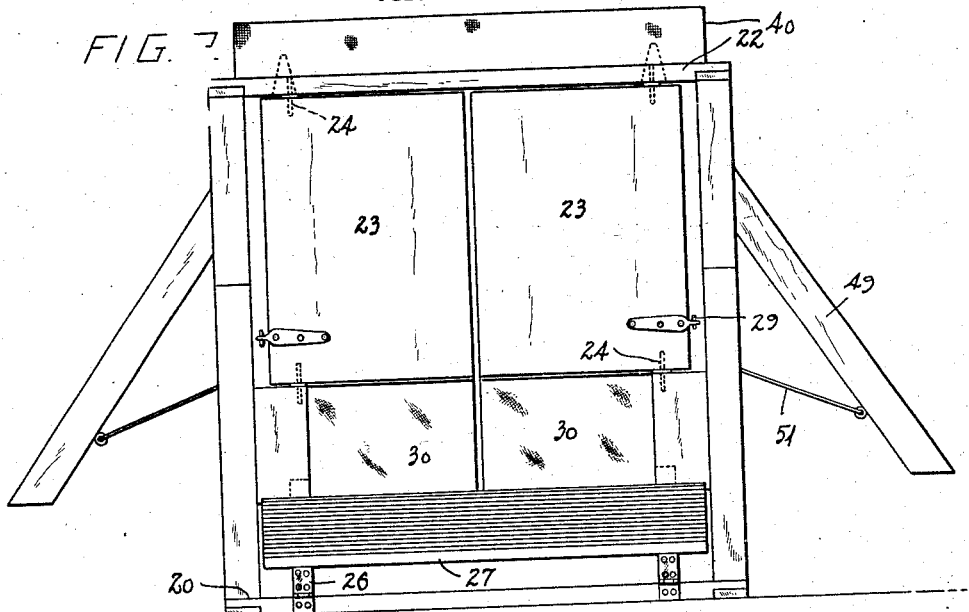
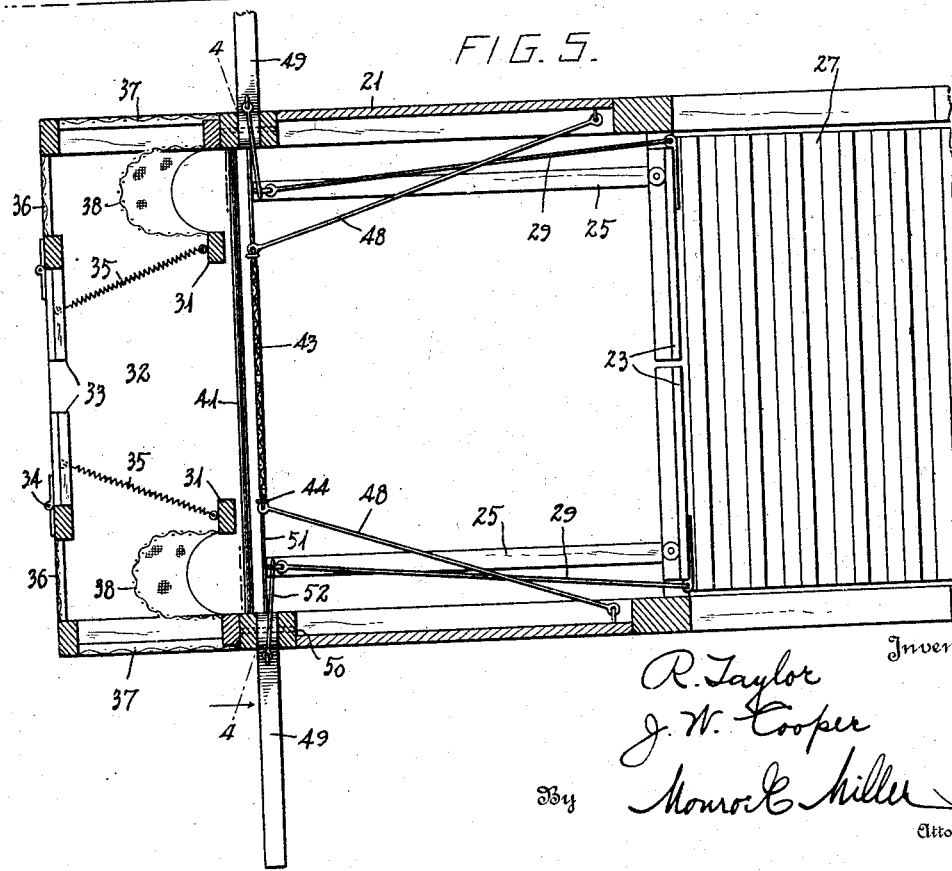
Inventors:
R. Taylor
J. W. Cooper
By Monroe E. Miller
Attorney.

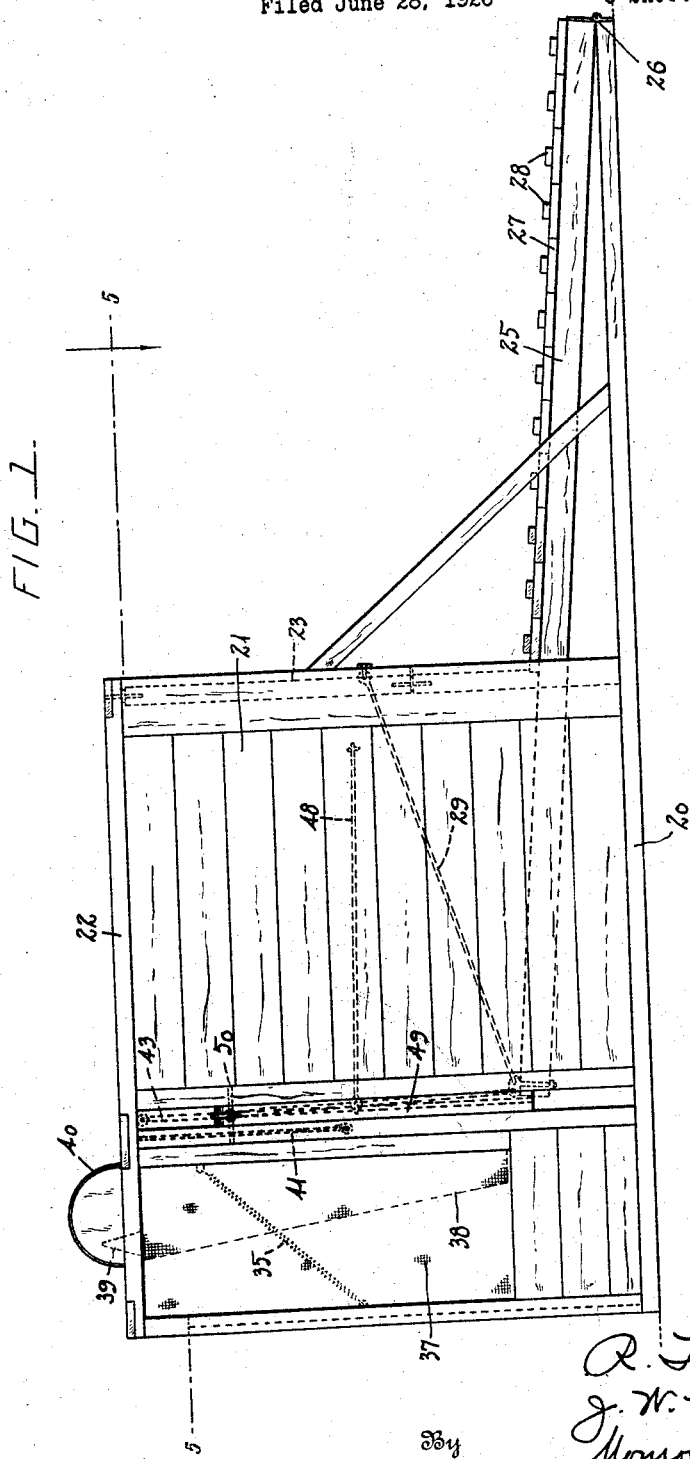

June 14, 1927.

R. TAYLOR ET AL

FLYTRAP

Filed June 28, 1926

Inventors:
R. Taylor
J. W. Cooper
By Monroe E. Miller
Attorney.

Patented June 14, 1927.

1,632,635

UNITED STATES PATENT OFFICE.

RAOLO TAYLOR AND JOHN W. COOPER, OF SEDALIA, MISSOURI.

FLYTRAP.

Application filed June 28, 1926. Serial No. 119,138.

The present invention relates to fly or insect traps of the kind for brushing or scaring flies and other insects from cows and other animals and catching the insects, and the primary object of the invention is the provision of a novel and improved device of that kind through which the animals may pass and constructed and operable in a novel manner.

Another object of the invention is the provision of a trap of the kind indicated having novel means for brushing or scaring the insects from the animal as it passes through the trap, and novel means for confining or catching the insects.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the trap.

Fig. 2 is a front end view thereof.

Fig. 5 is a horizontal section on the line 5—5 of Fig. 1.

Figure 4:
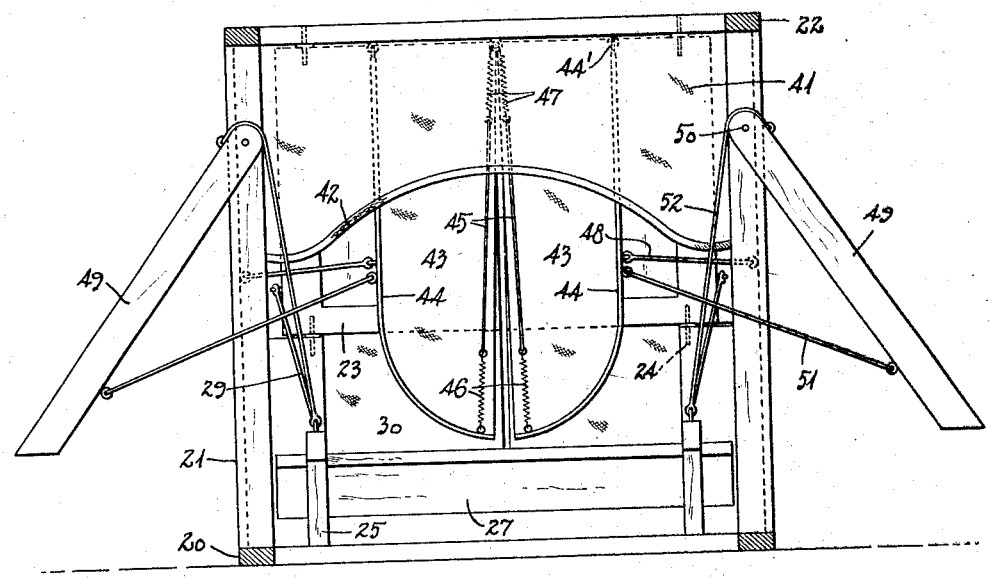
Fig. 4 is a cross section on the line 4—4 of Fig. 5.
Figure 3:
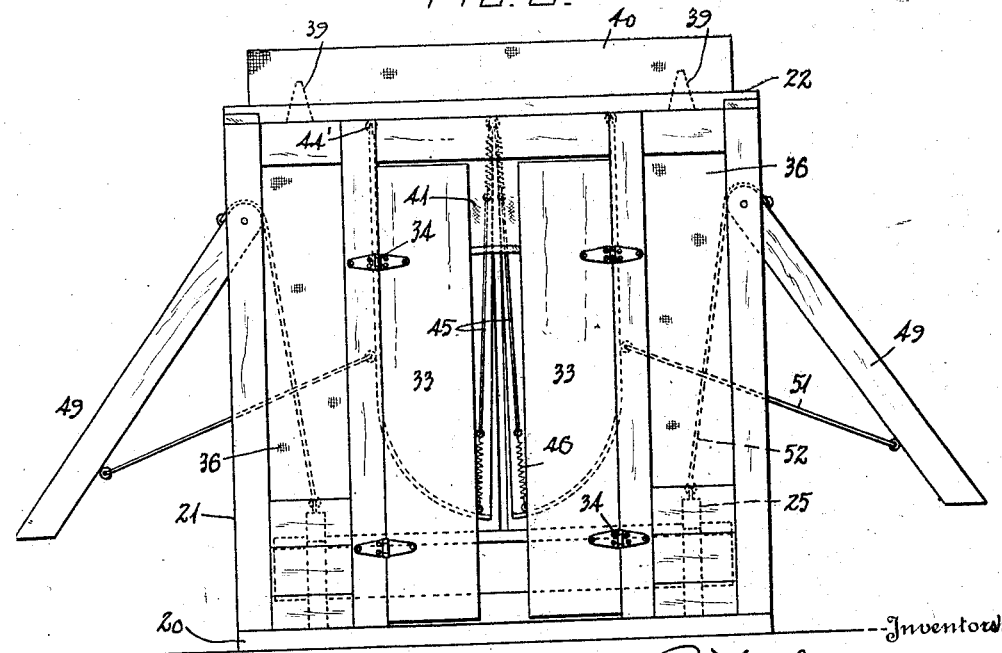
Fig. 3 is a rear end view of the trap.

In carrying out the invention there is provided a suitable frame of arched form so that the cows or animals may walk therethrough, said frame having the base 20 resting on the ground or floor, the sides 21 and top 22, which may be of wood or other suitable material.

At the entrance end of the passageway there is provided a pair of doors 23 spaced above the base 20, and hingedly connected, as at 24, near their opposite edges with the frame.

In order to open the doors 23 and operate other parts, as will hereinafter more fully appear, when the animal approaches the entrance, a tread member or ramp is provided extending from the front of the doors 23 to the entrance. Said ramp or tread member comprises longitudinal beams or levers 25 extending from a distance in front of the doors 23 into the trap to a point in rear of said doors, and the forward ends of the levers 25 are hinged, as at 26, to the forward end of the base 20 which projects beyond the doors 23. Boards 27 are secured on the levers 25 to provide the platform runway of the tread member or ramp, and have cleats 28 secured thereon to prevent the animal from slipping when walking on the tread member in entering the trap. Rods or links 29 connect the rear ends of the levers 25 and the outer edge portions of the doors 23, so that when said levers are depressed by the animal on the tread member, the rods 29 are moved rearwardly, thereby swinging the doors 23 open forwardly and outwardly. Aprons 30 of canvas or other flexible material are secured to the lower ends of the doors 23 to extend down to and contact with the tread member without interfering with the swinging movement of the doors 23, and thereby closing the opening between said doors and tread member when the doors are closed.

The frame is provided therein with posts 31 near the rear end of the frame and at the opposite sides of the exit 32 of the trap, and spaced inwardly from the sides 21. Exit doors 33 are hinged, as at 34, to the rear end of the frame at the opposite sides of the exit 33, and when closed have their adjacent edges spaced apart in order that the animal can see outwardly between said doors, and thereby pass on out of the trap past said doors. Coiled retractile springs 35 connect the doors 33 and posts 31 to normally swing said doors closed, and to enable said doors to be readily swung rearwardly and outwardly by the animal.

The rear end of the frame has screen panels 36 at opposite sides of the doors 33, and the sides of the frame have screen panels 37 at the rear end of the frame, thereby admitting light to the rear portion of the frame.

Curved screens 38 are disposed across the spaces between the posts 31 and sides of the frame and have their edges secured to said posts and sides of the frame, and said screens 38 extend upwardly and downwardly to arrest the insects as they attempt to pass forwardly through the spaces or openings between the posts 31 and sides of the frame. The screens 38 extend upwardly to the top of the frame, and cones 39 extend upwardly from the top of the frame into a captivity chamber 40 on the top of the frame, whereby the insects in passing upwardly along the screens 38 will pass upwardly through the cones 39 into the chamber 40 from which they cannot escape, so that they may be exterminated. The light being admitted through the panels 36 and 37 will attract the insects from within the trap into the upwardly leading passages of the screens 38, so that the insects will be caught in the chamber 40.

A scraper or brush 41 of canvas or other flexible material depends from the top of the frame immediately in front of the posts 31, similar to a curtain, so that its lower edge portion bears on the back of the animal as it passes under said curtain or scraper, to scrape or scare the insects off the back of the animal. A chain 42 or other flexible weight is secured to or within the lower edge portion of the scraper 41, so that it bears on the back of the animal under pressure. The lower edge portion of the scraper 41 is preferably arched, as seen in Fig. 4.

A pair of curtain-like scrapers or brushes 43, also of canvas or other flexible material, is suspended from the top of the frame immediately in front of the scraper 41 and across the exit 32. The outer edges of the scrapers 43 are secured to depending rods 44 which are pivotally connected, as at 44′, at their upper ends with the top 22 of the frame, so as to swing transversely. The lower end portions of the rods 44 are curved or bent inwardly toward one another along converging lines, as seen in Fig. 4. Cords or other flexible elements 45 are secured to or within the inner edge portions of the scrapers 43, and have their lower and upper ends connected by the respective coiled retractile springs 46 and 47 with the lower end portions of the rods 44 and top 22 of the frame, respectively, thereby keeping the inner or adjacent edge portions of the scrapers taut, but permitting them to be bowed apart to conform to the sides of the animal as it passes between said scrapes 43. Rods 48 have flexible joints with the rods 44 and extend forwardly and have their forward terminals flexibly connected with the sides of the frame, whereby the rods 48 serve to brace the rods 44 and prevent said rods 44 from being bent or displaced forwardly or rearwardly.

In order to separate the scrapers 43 when the tread member is depressed, levers 49 are pivoted or fulcrumed, as at 50, within the sides of the frame at the opposite sides of the scrapers 43, and have long downwardly extending arms which are connected by rods or links 51 with the rods 44, so that when the levers 49 are swung outwardly and upwardly, the scrapers 43 are swung away from one another. Flexible elements 52 are secured to the rear terminals of the levers 25 and are connected to the upper short arms of the levers 49, so that when the tread member is depressed, the levers 49 are swung outwardly and upwardly. The levers 49 also serve to raise the tread member when the animal steps off said tread member in passing into the trap, inasmuch as the long lower arms of the levers 49 serve as weights, and in swinging downwardly will raise the tread member and swing the scrapers 43 toward one another, and the tread member being raised will, through the rods 29, swing the entrance doors 23 closed.

In operation, when the animal steps on the tread member to enter the trap, said tread member being depressed will, through the rods 29, swing the entrance doors 23 open, and the straps or elements 52 being pulled downwardly will swing the levers 49 upwardly, so as to swing the scrapers 43 apart. The animal may therefore enter the trap, and the distance between the entrance and scrapers 43 is such that before the animal steps off the tread member, it will move its head between the scrapers 43. Then, when the animal has entered the trap and steps off the tread member, the levers 49 swinging downwardly will raise the tread member, swing the doors 23 closed, and swing the scrapers 43 toward one another so that the inner edge portions of said scrapers bear against the sides of the animal's body, while the scraper 41 rests on the back of the animal. The doors 23 being closed will trap the insects, and as the animal passes on through the exit 32, the scrapers 41 and 43 will scrape or scare the insects from the back and sides of the animal. The scrapers 41 and 43 obstruct the exit 32 for the insects, and in attempting to fly along with the animal, will be attracted to the screens 38 through which the light passes from the panels 36 and 37, and the screens 38 will therefore arrest the flies, which in passing upwardly in their attempt to escape will pass through the cones 39 into the captivity chamber 40. The exit doors 33 obstruct the light from the exit 32, so that the insects in their attempt to escape are attracted to the screens 38, and the insects are thus trapped while the animal passes out through the exit between the doors 33 that are swung outwardly by the animal.

Having thus described the invention, what is claimed as new is:—

1. A device of the character described comprising a frame having a passageway for an animal, scrapers of flexible material to contact with the sides of the animal, rods suspended within the frame for transverse movement and having their lower terminals converging toward one another, the outer edge portions and lower ends of said scrapers being attached to said rods, and means operated by the animal when approaching said scrapers for swinging said rods away from one another.

2. A device of the character described comprising a frame having a passageway for an animal, transverse scrapers of flexible material to contact with the sides of the animal, members connected to the outer edge portions and lower ends of said scrapers and mounted in the frame for transverse movement, and means operated by the animal when approaching said scrapers for swinging said members away from one another.

In testimony whereof we hereunto affix our signatures.

RAOLO TAYLOR.
JOHN W. COOPER.